UNITED STATES PATENT OFFICE.

FARNHAM MAXWELL LYTE, OF COTFORD, COUNTY OF SURREY, ENGLAND.

PURIFYING POTABLE AND OTHER WATERS.

SPECIFICATION forming part of Letters Patent No. 341,853, dated May 11, 1886.

Application filed July 24, 1885. Serial No. 172,577. (No specimens.) Patented in England January 21, 1885, No. 900; in France March 21, 1885, No. 167,790, and in Belgium July 17, 1885, No. 69,630.

*To all whom it may concern:*

Be it known that I, FARNHAM MAXWELL LYTE, of Cotford, Oakhill Road, Putney, in the county of Surrey, England, analytical chemist, have invented new and useful Improvements in Clarifying and Deodorizing Sewage and other Foul and Polluted Waters, and in Softening and Purifying the Water Used for Manufacturing and Domestic Purposes, of which the following is a full, clear, and exact description.

It has long since been proposed, in order to purify sewage and other foul waters, to add thereto aluminium sulphate or chloride and (unless the water contains a sufficient amount of some basic substance capable of precipitating the aluminium hydroxide) enough milk of lime or chalk to saturate the acid therein and set free the hydroxide in the body of the liquid.

My invention consists in the employment, in lieu of a portion of this sulphate or chloride, of the sodium aluminate or some other soluble aluminate in the right proportion for the exact neutralization of all the base the aluminate contains.

Adopting the nomenclature of Roscoe, the following equation represents the reaction:

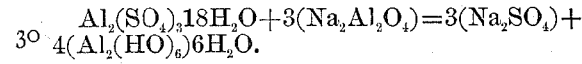

I have also found that several other salts, even if neutral in the strict sense of the term—as, for instance, the calcium sulphate or chloride, or the salts of magnesium, zinc, or, indeed, any of the soluble salts of the heavy metals and numerous others—act like acid salts in decomposing the sodium or other soluble aluminate, by reason of the superior affinity of the base of the aluminate for their acid as compared with that of their acid for the base which they contain. The reaction is exemplified by the following formula, adopting once more the nomenclature of Roscoe, viz:

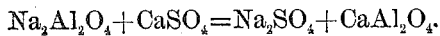

But as carbonic acid is generally (and I have found, in practice, invariably) present in the waters requiring purification, the aluminate of lime shown in this equation is decomposed into calcium carbonate and aluminium hydroxide, as follows:

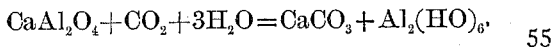

It will be seen at once by any chemist that $CaSO_4$ is one of the salts which give to water the quality termed "permanent hardness." Water for domestic and manufacturing purposes may therefore be freed from this permanent hardness by the use of the sodium or other soluble aluminate. Thus for each degree of permanent hardness about 2.27 grains of raw aluminate of twenty-seven per cent. of soda and thirty-three per cent. of alumina will be required; but it is difficult to fix the exact quantity on account of the varying composition of the aluminate of commerce. Any excess of "temporary hardness" over and above the permanent hardness can also, if desired, be neutralized by an additional quantity of the aluminate.

I claim—

1. The herein-described process of clarifying and deodorizing sewage and foul or impure waters, which process consists in the production in the liquid of aluminium hydroxide from sodium or other soluble aluminate and an acid aluminium salt, substantially as specified.

2. The herein-described process of purifying and softening water for domestic and manufacturing purposes, which process consists in adding sodium or other soluble aluminate to the water containing in solution calcium or other fixed earthy or metallic salts, substantially as specified.

The foregoing specification of my improvements in clarifying and deodorizing sewage and other foul and polluted waters, and in softening and purifying the water used for manufacturing and domestic purposes, signed by me this 9th day of July, 1885.

FARNHAM MAXWELL LYTE.

Witnesses:
A. M. WELMAN,
CECIL MAXWELL LYTE.